US012732790B2

(12) United States Patent
Kumar et al.

(10) Patent No.: US 12,732,790 B2
(45) Date of Patent: Sep. 8, 2026

(54) SYSTEM AND METHODS TO MAINTAIN PRIORITY OF VPLMN

(71) Applicant: SAMSUNG ELECTRONICS CO., LTD., Suwon-si (KR)

(72) Inventors: Lalith Kumar, Bangalore (IN); Danish Ehsan Hashmi, Bangalore (IN); Arijit Sen, Bangalore (IN); Jagadeesh Gandikota, Bangalore (IN); Koustav Roy, Bangalore (IN); Varini Gupta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 291 days.

(21) Appl. No.: 18/261,066

(22) PCT Filed: Jan. 11, 2022

(86) PCT No.: PCT/KR2022/000421
§ 371 (c)(1),
(2) Date: Jul. 11, 2023

(87) PCT Pub. No.: WO2022/154420
PCT Pub. Date: Jul. 21, 2022

(65) Prior Publication Data

US 2024/0314536 A1 Sep. 19, 2024

(30) Foreign Application Priority Data

Jan. 13, 2021 (IN) ............................. 202141001681
Jan. 22, 2021 (IN) ............................. 202141003062

(Continued)

(51) Int. Cl.

*H04W 8/12* (2009.01)
*H04W 60/04* (2009.01)
*H04W 84/04* (2009.01)

(52) U.S. Cl.
CPC ............ *H04W 8/12* (2013.01); *H04W 60/04* (2013.01); *H04W 84/042* (2013.01)

(58) Field of Classification Search
CPC ..... H04W 8/12; H04W 60/04; H04W 84/042; H04W 48/18; H04W 8/06
See application file for complete search history.

(56) References Cited

U.S. PATENT DOCUMENTS 12,401,985 B2 * 8/2025 Buckley .................. H04W 8/06
2019/0182655 A1 * 6/2019 Gupta ................. H04W 12/102

(Continued)

FOREIGN PATENT DOCUMENTS

CN 110945886 A 3/2020
CN 112042214 A 12/2020
WO 2020050700 A1 3/2020

OTHER PUBLICATIONS

Supplementary European Search Report dated Apr. 30, 2024, in connection with European Patent Application No. 22739615.7, 11 pages.

(Continued)

*Primary Examiner* — Christopher M Brandt

(57) ABSTRACT

Embodiments herein provide a method for managing a priority of Visited Public Land Mobile Networks (VPLMNs) of a wireless communication network. The method includes receiving a registration accept message including steering of roaming (SoR) information from a VPLMN; in response to a security check of the SoR information being failed, adding the VPLMN to a SoR abort list including PLMNs where a registration was aborted due to SoR; and deleting the SoR abort list after a predetermined time period.

18 Claims, 10 Drawing Sheets

(30) Foreign Application Priority Data

Nov. 3, 2021 (IN) ............................ 202141050645
Dec. 21, 2021 (IN) ............................ 202141001681

(56) References Cited

U.S. PATENT DOCUMENTS

2019/0268752 A1 8/2019 Buckley et al.
2020/0221281 A1 7/2020 Rajadurai et al.
2020/0344606 A1* 10/2020 Zaus ....................... H04W 8/18
2022/0070649 A1* 3/2022 Sahin .................. H04L 65/1073
2022/0312360 A1* 9/2022 Kuppelur .............. H04W 60/04
2022/0394456 A1* 12/2022 Liu ......................... H04W 8/06

OTHER PUBLICATIONS

Apple, "Handling of PLMNs where registration was aborted due to SOR" list, C1-207712, 3GPP TSG-CT WG1 Meeting #127-e, Electronic meeting, Nov. 2020, 8 pages.
International Search Report and Written Opinion of the International Searching Authority dated Mar. 29, 2022, in connection with International Application No. PCT/KR2022/000421, 7 pages.
Intellectual Property India, "Examination report under sections 12&13 of the Patents Act" dated Aug. 8, 2022, in connection with Indian Patent Application No. 202141001681, 6 pages.
Apple, "Handling of PLMNs where registration was aborted due to SOR list", C1-207513, 3GPP TSG-CT WG1 #127-e, 9 pages.
Orange et al., "SoR in HPLMN after registration", C1-202068, 3GPP TSG-CT WG1 #123-e, 11 pages.
NTT Docomo et al., "SOR-CMCI configuration and session handling for enhanced control plane SOR in connected mode", C1-207036, 3GPP TSG-CT WG1 #126-e, 12 pages.
Ericsson, "Enhancement for CP-SOR for UE in connected mode", C1-205289, 3GPP TSG-CT WG1 #125-e, 12 pages.
Office Action issued Jun. 30, 2026, in connection with Chinese Patent Application No. 202280009775.8, 18 pages.
3GPP TS 23.122 V15.4.0 (Jun. 2018) Technical Specification; 3rd Generation Partnership Project; Technical Specification Group Core Network and Terminals; Non-Access-Stratum (NAS) functions related to Mobile Station (MS) in idle mode (Release 15); 60 pages.
3GPP TS 23.122 V16.9.0 (Dec. 2020) Technical Specification; 3rd Generation Partnership Project; Technical Specification Group Core Network and Terminals; Non-Access-Stratum (NAS) functions related to Mobile Station (MS) in idle mode (Release 16); 83 pages.

* cited by examiner

SYSTEM AND METHODS TO MAINTAIN PRIORITY OF VPLMN

CROSS-REFERENCE TO RELATED APPLICATIONS

This application is a U.S. National Phase Entry of PCT International Application No. PCT/KR2022/000421, which was filed on Jan. 11, 2022, and claims priority to Indian patents application Nos. 202141001681, 202141003062, 202141050645 and 202141001681, which were filed in the Indian Intellectual Property Office on Jan. 13, 2021, Jan. 22, 2021, Nov. 13, 2021 and Dec. 21, 2021, respectively, the entire disclosure of each of which is incorporated herein by reference.

TECHNICAL FIELD

The present disclosure relates to a wireless communication network, and more specifically to methods and a system for managing a priority of Public Land Mobile Networks (PLMNs) in the wireless communication network.

BACKGROUND ART

Steering of Roaming (SoR or SOR) refers to a configuration with a priority among VPLMNs which is used by a User Equipment (UE) to select a Visited Public Land Mobile Network (VPLMN) in a roaming area. The SoR is configured by a Home PLMN (HPLMN) in the UE. It is very important from HPLMN perspective that the UE remains on the priority VPLMN configured by the HPLMN because its directly related to revenue of the HPLMN. For e.g. VPLMN-1 may charge less to HPLMN whereas as VPLMN-2 may charge more to HPLMN for same services based on the roaming or business agreements between HPLMN and VPLMN. In the conventional methods, if a SoR security check fails on the received SoR information, then the UE assumes that the VPLMN is malicious and leaves that VPLMN in search of some other VPLMN in the area by the adding that VPLMN in "PLMNs where registration was aborted due to SOR" list also called SoR abort list. But the prior art does not take into account the fact that SOR security check failure can also happen due to some temporary HPLMN issues, under such conditions also the UE assumes the serving VPLMN as malicious and is added to the "PLMNs where registration was aborted due to SOR" and continuous to keep that VPLMN for lower priority though there is no mistakes done by the VPLMN, and the VPLMN is punished for no offense. This is not desirable for a case where the HPLMN actually wants the UE to move to that VPLMN. The HPLMN, at later point of time, may keep transmitting the SOR information for this purpose many times to the UE. But due to this the "PLMNs where registration was aborted due to SOR" stored in the UE, and the UE will not move to HPLMN's preferred VPLMN which is not desirable and continue to cost more to the HPLMN and also potentially impacting services of the UE by camping on the non-preferred VPLMN.

FIG. 1 illustrates an example sequence diagram depicting a conventional flow when the UE (10) registers to a 5G Core Access and Mobility Management Function (AMF) of the VPLMN (20) (hereinafter referred as VPLMN AMF (20)) during the SoR, according to a prior art.

Referring to FIG. 1, in step 101, the UE (10) transmits a registration request message to the VPLMN-1 AMF (20-1) for registration. In step 102, upon receiving the registration request message, the VPLMN-1 AMF (20-1) executes the registration procedure which the VPLMN-1 AMF (20-1) interacts with HPLMN UDM/AUSF 30, as part of a registration procedure the UE (10) may receive a registration accept message including the SoR information in step 103.

Upon retrieving the SoR information from the VPLMN AMF (20), the UE (10) performs a SoR information security check in step 104. but security check is failed. The UE (10) adds VPLMN-1 AMF (20-1) to "PLMNs where registration was aborted due to SoR" list. The UE (10) deprioritize VPLMN-1 AMF (20-1), performs PLMN selection to select VPLMN-2 AMF (20-2) in step 104.

The SoR information security check fails as depicted in step 4. The failure of the SoR information security check may cause the UE (10) to consider a registration failure in the VPLMN-1 AMF (20-1). In such a scenario, the UE (10) tries to register to other available VPLMN-2 AMF (20-2). When the SoR information security check fails, the UE (10) may create the "PLMNs where registration was aborted due to SoR" list to deprioritize or block VPLMN-1 AMF (20-1), performs PLMN selection to select VPLMN-2 AMF (20-2). The UE (10) adds VPLMN-1 AMF (20-1) to "PLMNs where registration was aborted due to SoR" list in step 104. In step 105, the UE (10) transmits a registration request to the VPLMN-2 AMF (20-2). Upon receiving the registration request, the VPLMN-2 AMF (20-2) interacts with the HPLMN UDM/AUSF (30) to get subscription data information. After step 106, the VPLMN-2 AMF (20-2) transmits the registration accept including SoR information IE to the UE (10) and in step 108 the UE (10) receives the SoR information IE and the security check is successful. The UE (10) remains registered on the VPLMN-2 AMF (20-2).

However, if the created "PLMNs where registration was aborted due to SoR" list is not updated properly, the UE (10) may not be able to camp on a best roaming PLMN and associated services. Thus, the conventional approaches do not involve any mechanism that enable the UE (10) to handle the created "PLMNs where registration was aborted due to SoR" list.

Consider an example "where the priority order of the PLMNs configured in the UE area for example P1, P2, and P3 where P1, P2, and P3 are VPLMNs. In such scenario, the UE (10) tries to register on the P1 and receives the SoR information as part of the registration accept and performs the SoR information security check. If the SoR information security check fails, then the UE (10) adds the P1 to the "SoR abort list". Further, the UE (10) tries to register on the P2. If the SoR information security check fails for the P2, then the UE (10) adds the P2 to the "SoR abort list". Further, the UE (10) tries to register on the P3. If the SoR information security check is successful for the P3, then the UE (10) access communication services on the P3.

Consider, the HPLMN (30) transmits an updated Operator controlled PLMN selector with Access Technology (OPLMN) list to the UE (10) in which P1, P2 are higher priority than P3. Though, the network tries to update the UE (10) with higher priority VPLMNs (i.e. P1 or P2) with Over-The-Air (OTA) update or the SoR procedure, the UE (10) does not move to the P1 or the P2, as both the P1 and P2 are part of the "SoR abort list" and the UE (10) may camp on the lower priority VPLMN (i.e. P3) for the communication services. This is not desirable.

FIG. 2 illustrates a flow chart illustrates a scenario in which no OPLMN is found after the HP-PLMN search timer expiry and the SoR security failure has occurred in the registered PLMN, according to a prior art.

The flow of the scenario is given through the steps 401-404. Consider the conventional methods and systems in which the UE (10) does not trigger registration on the R-2, and the R-3 even though the R-2, and the R-3 are available, and the UE (10) remains registered with the R-1 even though the SoR security check was not successful on the R-1 in step 401. Consider, the UE (10) is configured for the OPLMNs OP-1, OP-2, OP-3 and the random PLMNs R-1, R-2, R-3. R-1 is in the "PLMNs where registration was aborted due to SoR" list. The UE (10) is registered on the R-1.

When the UE (10) camped on R-1 and the HP-PLMN timer is not expired in step 402, the UE (10) remains registered on R-1 in step 403. When the UE (10) camped on R-1 and the HP-PLMN timer expires in step 402, and if the OP-1, OP-2, OP-3 are not available and only R-1, R-2, R-3 PLMNs available in step 404, then the UE (10) will not trigger registration on the R-2, R-3 even though the R-2, R-3 are available. The problem is that the UE (10) does not search, camp and trigger the registration on the R-2 or R-3, and the UE (10) remains registered with the R-1 in step 403, even though the SoR security check was not successful on the R-1. If none of the OPLMN is found or only the random PLMN (e.g. R-2, R-3) is found after the HP-PLMN timer expiry in step 402, while the UE (10) is registered on the random PLMN (e.g. R-1) and if the R-1 had encountered the SoR security check failure earlier, then the UE (10) will still be in the same registered random PLMN (e.g. R-1) even though other random PLMNs are available till a new OPLMN or higher priority PLMN is found by the UE (10). In other words, the UE (10) remains on the random PLMN R-1 even though the R-1 is part of SoR abort list, even other random PLMNs are available in the area. This behaviors of the UE (100) continues till a new OPLMN or the higher priority PLMN is found by the UE (100). Thus, it is desired to address the above-mentioned shortcomings or at least provide a useful alternative.

DISCLOSURE OF INVENTION

Solution to Problem

The principal object of the embodiments herein is to provide a method and a UE for managing a priority of Public Land Mobile Networks (PLMNs) of a wireless communication network.

Another object of the embodiments herein is to maintain Visited Public Land Mobile Network (VPLMN) list during a SoR by at least one of, maintaining a SoR abort list timer for all VPLMNs, maintaining the SoR abort list timer separately for each VPLMN, maintaining an OPLMN list, and maintaining a SoR abort list based on a location of the UE Accordingly, the embodiments herein provide a method for managing a priority of Public Land Mobile Networks (PLMNs) of a wireless communication network. The method includes receiving, by the UE, Steering of Roaming (SoR) information in a Non-Access Stratum (NAS) message like a registration accept message or a Downlink-NAS (DL-NAS) transport message from a Visited PLMN (VPLMN), where the priority of the VPLMN is a configured priority. The method includes detecting, by the UE, a security check failure of the SoR information. The method includes initiating, by the UE, a SoR abort list timer of the UE. The method includes managing, by the UE, the priority of the VPLMN based on the SoR abort list timer.

In an embodiment, where the managing, by the UE, the priority of the VPLMN based on the SoR abort list timer, includes determining, by the UE, whether a SoR abort list is available at the UE, wherein the SoR abort list corresponds to a list of PLMNs where registration was aborted due to SoR, performing, by the UE, one of: adding the VPLMN to the SoR abort list upon determining that the SoR abort list is available, and creating the SoR abort list upon determining that the SoR abort list is unavailable at the UE, and adding the VPLMN to the SoR abort list, and modifying, by the UE, the priority of the VPLMN from the configured priority to a lower priority till an expiry or a stop of the SoR abort list timer.

In an embodiment, where the method includes detecting, by the UE, the expiry or the stop of the SoR abort list timer. The method includes deleting, by the UE, the VPLMN from the SoR abort list or the complete SoR abort list. The method includes modifying, by the UE, the priority of the VPLMN from the lower priority to the configured priority.

Accordingly, the embodiments herein provide the UE for managing the priority of the PLMNs of the wireless communication network. The UE includes a SoR abort list controller, the SoR abort list timer, a memory, a processor, where the SoR abort list controller is coupled to the memory and the processor. The SoR abort list controller is configured for receiving the SoR information in the NAS message from the VPLMN, where the priority of the VPLMN is the configured priority. The SoR abort list controller is configured for detecting a security check failure of the SoR information. The security check is the method of running integrity check on the received SOR information. The SOR information is integrity protected by HPLMN and if integrity check is successful then SOR check is successful otherwise if the integrity check is not successful UE consider security check has failed. This can be extended to any new security mechanism defined in the future. Steering of Roaming (SOR) information consists of the following HPLMN protected information (which is integrity protected by including an appropriate MAC or integrity check header):

a) the following indicators, of whether:
   - the UDM requests an acknowledgement from the UE for successful reception of the steering of roaming information.
   - the UDM requests the UE to store the SOR-CMCI in the ME, which is provided along with the SOR-CMCI; and b) one of the following:

1) one or both of the following:
   - a list of preferred PLMN/access technology combinations with an indication that it is included.
   - SOR-CMCI;

2) a secured packet with an indication that it is included; or 3) the HPLMN indication that 'no change of the "Operator Controlled PLMN Selector with Access Technology" list stored in the UE is needed and thus no list of preferred PLMN/access technology combinations is provided', and SOR-CMCI, if any.

The SoR abort list controller is configured for initiating a SoR abort list timer of the UE. The SoR abort list controller is configured for managing the priority of the VPLMN based on the SoR abort list timer.

The embodiments herein provide a method for managing a priority of visited public land mobile networks (VPLMNs) of a wireless communication network by a user equipment (UE), comprising: receiving a registration accept message including steering of roaming (SoR) information from a VPLMN; in response to a security check of the SoR information being failed, adding the VPLMN to a SoR abort list including PLMNs where a registration was aborted due to SoR; and deleting the SoR abort list after a predetermined time period.

The embodiments herein provide a user equipment (UE) for managing a priority of visited public land mobile networks (PLMNs) of a wireless communication network, the UE comprising: a transceiver; and a processor (130) coupled to the transceiver, wherein the processor is configured to: receive a registration accept message including steering of roaming (SoR) information from a VPLMN, in response to a security check of the SoR information being failed, add the VPLMN to a SoR abort list including PLMNs where a registration was aborted due to SoR, and delete the SoR abort list after a predetermined time period.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

MODE FOR THE INVENTION

Figure 1:
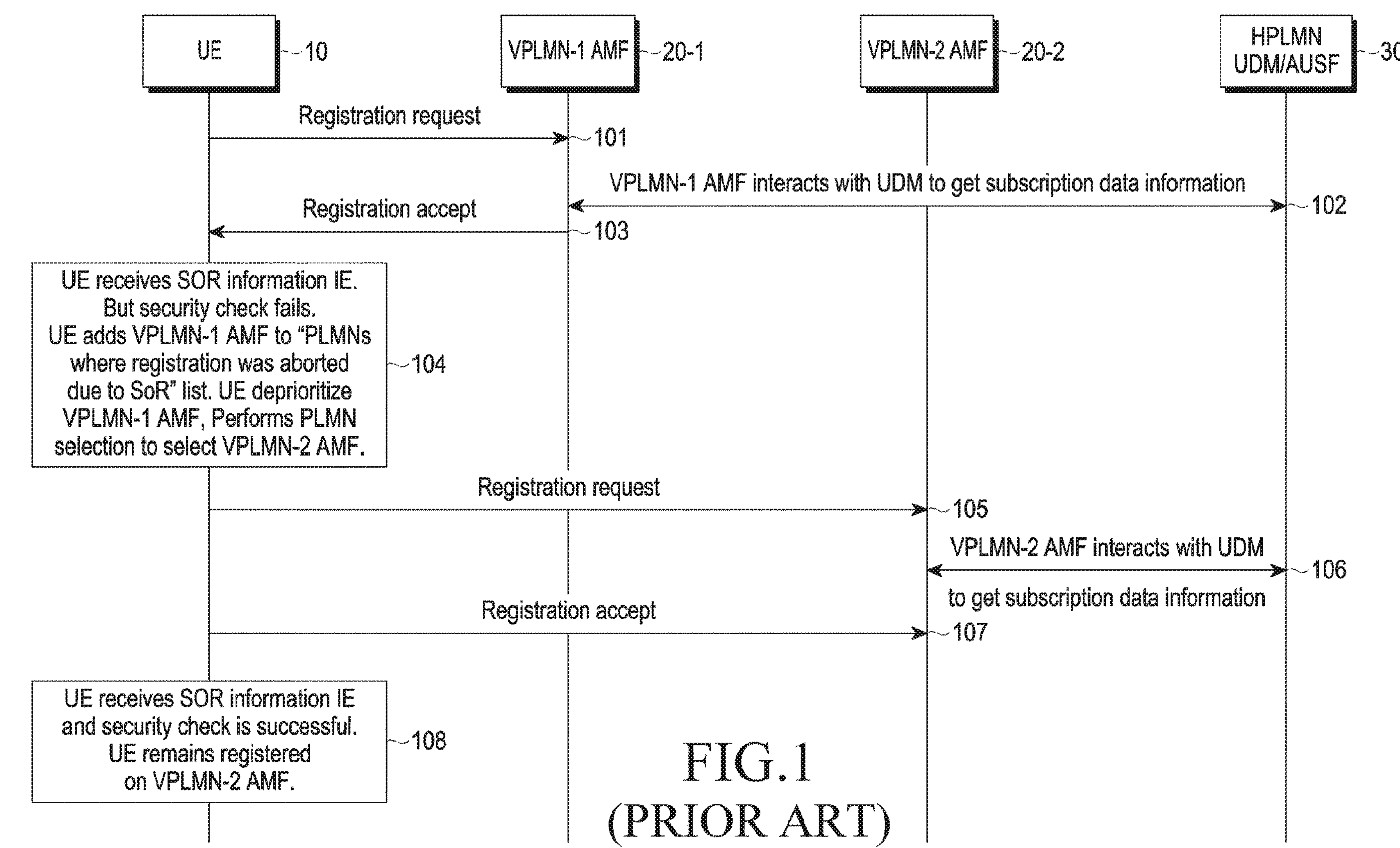
FIG. 1 illustrates an example sequence diagram depicting a conventional flow when a UE registers to a AMF of a VPLMN during a SoR, according to a prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this document, the term "VPLMN" or "VPLMN AMF" are interchangeably used.

A description each abbreviation used in this disclosure is given below.

i) UPLMN: each PLMN/access technology combination in the "User Controlled PLMN Selector with Access Technology" data file in the SIM (in priority order) or ME.

ii) OPLMN: each PLMN/access technology combination in the "Operator Controlled PLMN Selector with Access Technology" data file in the SIM (in priority order) or stored in the ME (in priority order).

iii) Random PLMN: Other PLMN/access technology combinations with received high quality signal in random order which is not in OPLMN, UPLMN or EHPLMN etc.

Following are the considerations of the proposed method: PLMN names with OP-x e.g. OP-1, OP-2 corresponds to PLMNs part of OPLMN list. PLMN names with UP-x e.g. UP-1, UP-2 corresponds to PLMNs part of UPLMN list. PLMN names with R-x e.g. R-1, R-2 corresponds to PLMNs part of random PLMN list. A HP-PLMN search timer corresponds to timer 'T' defined in 3GPP specification.

Accordingly, the embodiments herein provide a method for managing a priority of Public Land Mobile Networks (PLMNs) of a wireless communication network. The method includes receiving, by the UE, Steering of Roaming (SoR) information in a Non-Access Stratum (NAS) message from a Visited PLMN (VPLMN), where the priority of the VPLMN is a configured priority. The method includes detecting, by the UE, a security check failure of the SoR information. The method includes initiating, by the UE, a SoR abort list timer of the UE. The method includes managing, by the UE, the priority of the VPLMN based on the SoR abort list timer.

Accordingly, the embodiments herein provide the UE for managing the priority of the PLMNs of the wireless communication network. The UE includes a SoR abort list controller, the SoR abort list timer, a memory, a processor, where the SoR abort list controller is coupled to the memory and the processor. The SoR abort list controller is configured for receiving the SoR information in the NAS message from the VPLMN, where the priority of the VPLMN is the configured priority. The SoR abort list controller is configured for detecting a security check failure of the SoR information. The SoR abort list controller is configured for initiating a SoR abort list timer of the UE. The SoR abort list controller is configured for managing the priority of the VPLMN based on the SoR abort list timer.

Unlike existing methods and systems, the proposed Mobile Station (MS) or the UE shall make a first attempt after a period of at least two minutes and at most 'T minutes', only after switch on if a Fast First Higher Priority PLMN search is disabled or after switch on or upon selecting the VPLMN and registration on that VPLMN is successful also a Security Of Records (SOR) check is successful, if the Fast First Higher Priority PLMN search is enabled.

Unlike existing methods and systems, the proposed UE maintains the VPLMN list during SoR by at least one of, maintaining a "SoR abort list" timer for all VPLMNs, maintaining the "SoR abort list" timer separately for each VPLMN, maintaining an OPLMN list, and maintaining the "SoR abort list" based on a location of the UE.

Referring now to the drawings, and more particularly to FIGS. 3 through 10, there are shown preferred embodiments.

Figure 3:
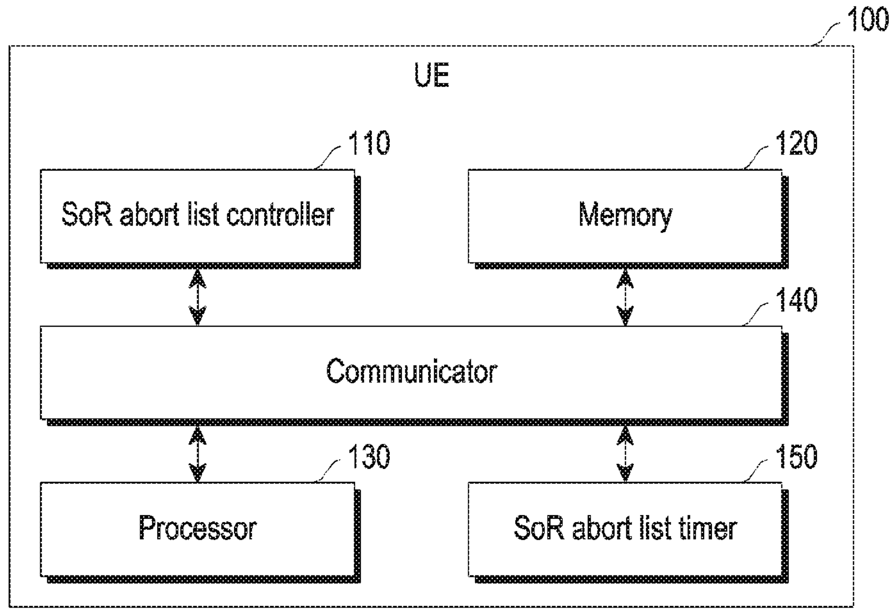
FIG. 3 illustrates a block diagram of a proposed UE for managing a priority of PLMNs of a wireless communication network, according to an embodiment as disclosed herein.

FIG. 3 illustrates a block diagram of a proposed UE (100) for managing a priority of PLMNs of a wireless communication network, according to an embodiment as disclosed herein.

Examples of the UE (100) include, but are not limited to a smartphone, a tablet computer, a Personal Digital Assistance (PDA), a desktop computer, an Internet of Things (IoT), a wearable device, etc. An example of the wireless communication network is a cellular network. In an embodiment, the UE (100) includes a Steering of Roaming (SoR) abort list controller (110), a memory (120), a processor (130), a communicator (140), and a SoR abort list timer (150). The SoR abort list controller (110) and the SoR abort list timer (150) are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The SoR abort list controller (110) transmits a registration request message to a VPLMN (20) of the wireless communication network. In an embodiment, the priority of the VPLMN (20) at the UE (100) is a configured priority while the UE (100) is transmitting the registration request message. The SoR abort list controller (110) receives a registration response message includes SoR information from the VPLMN (20). An example for the registration response message is a NAS message, a registration accept message or a Downlink-NAS (DL-NAS) transport message. Further, the SoR abort list controller (110) performs a security check using the SoR information. Further, the SoR abort list controller (110) detects a failure in the security check of the SoR information. Further, the SoR abort list controller (110) initiates the SoR abort list timer (150). Further, the SoR abort list controller (110) manages the priority of the VPLMN (20) based on the SoR abort list timer (150).

In an embodiment, the SoR abort list controller (110) determines whether a SoR abort list is available at the UE (100), where the SoR abort list corresponds to a list of PLMNs where registration was aborted due to SoR. Further, the SoR abort list controller (110) adds the VPLMN (20) to the SoR abort list upon determining that the SoR abort list is available and the SoR abort list timer (150) is started. The SoR abort list controller (110) creates the SoR abort list upon determining that the SoR abort list is unavailable at the UE (100). Further, the SoR abort list controller (110) adds the VPLMN (20) to the SoR abort list when the SoR abort list timer (150) is started. The SoR abort list controller (110) modifies the priority of the VPLMN (20) from the configured priority to a lower priority till an expiry or a stop of the SoR abort list timer (150).

In an embodiment, the SoR abort list controller (110) detects the expiry or the stop of the SoR abort list timer (150). Further, the SoR abort list controller (110) deletes the VPLMN (20) from the SoR abort list or deletes the complete SoR abort list. Further, the SoR abort list controller (110) modifies the priority of the VPLMN (20) from the lower priority to the configured priority. The SoR abort list controller (110) and SoR abort list timer (150) may be implemented as the processor (130) respectively.

The memory (120) stores the SoR abort list upon creating the SoR abort list by the SoR abort list controller (110). The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the UE (100), a cloud storage, or any other type of external storage.

The processor (130) is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The communicator (140) is configured for communicating internally between hardware components in the UE (100). Further, the communicator (140) is configured to facilitate the communication between the UE (100) and other devices via one or more networks (e.g. Radio technology). The communicator (140) includes an electronic circuit specific to a standard that enables wired or wireless communication. The communicator (140) may be implemented as a transceiver.

Although the FIG. 3 shows the hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function for managing the priority of PLMNs of the wireless communication network.

Figure 4:
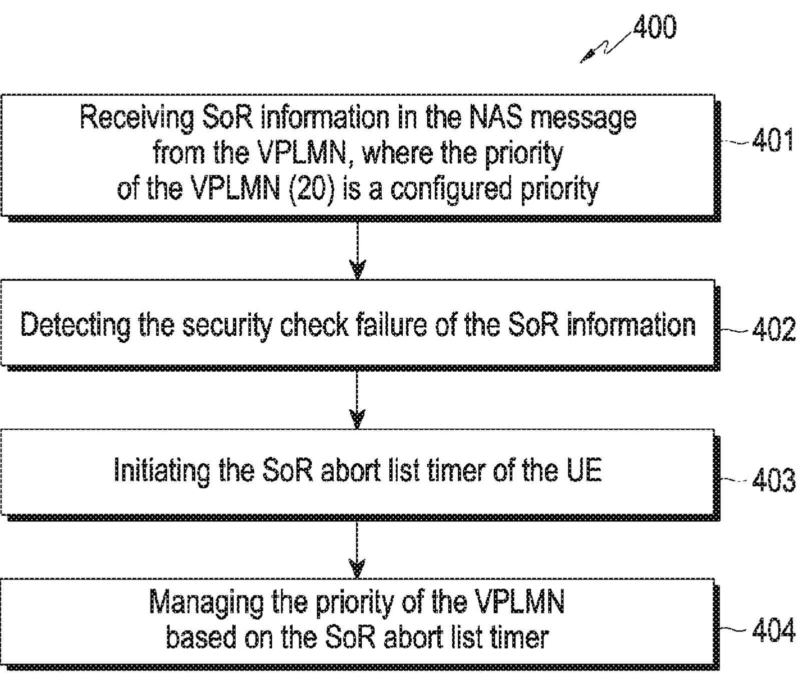
FIG. 4 illustrates a flow diagram illustrating a method for managing the priority of the PLMNs of the wireless communication network, according to an embodiment as disclosed herein.

FIG. 4 illustrates a flow diagram (400) illustrating a method for managing the priority of the PLMNs of the wireless communication network, according to an embodiment as disclosed herein.

In an embodiment, the method allows the SoR abort list controller (110) to perform steps 401-404 of the flow diagram (400). In step 401, the method includes receiving the SoR information in the NAS message from the VPLMN (20), where the priority of the VPLMN (20) is the configured priority. In step 402, the method includes detecting the security check failure of the SoR information. In step 403, the method includes initiating the SoR abort list timer (150) of the UE (100). In step 404, the method includes managing the priority of the VPLMN (20) based on the SoR abort list timer (150).

The various actions, acts, blocks, steps, or the like in the flow diagram (400) may be performed in the order presented, in a different order or simultaneously. Further, in some embodiments, some of the actions, acts, blocks, steps, or the like may be omitted, added, modified, skipped, or the like without departing from the scope of the invention.

Figure 5:
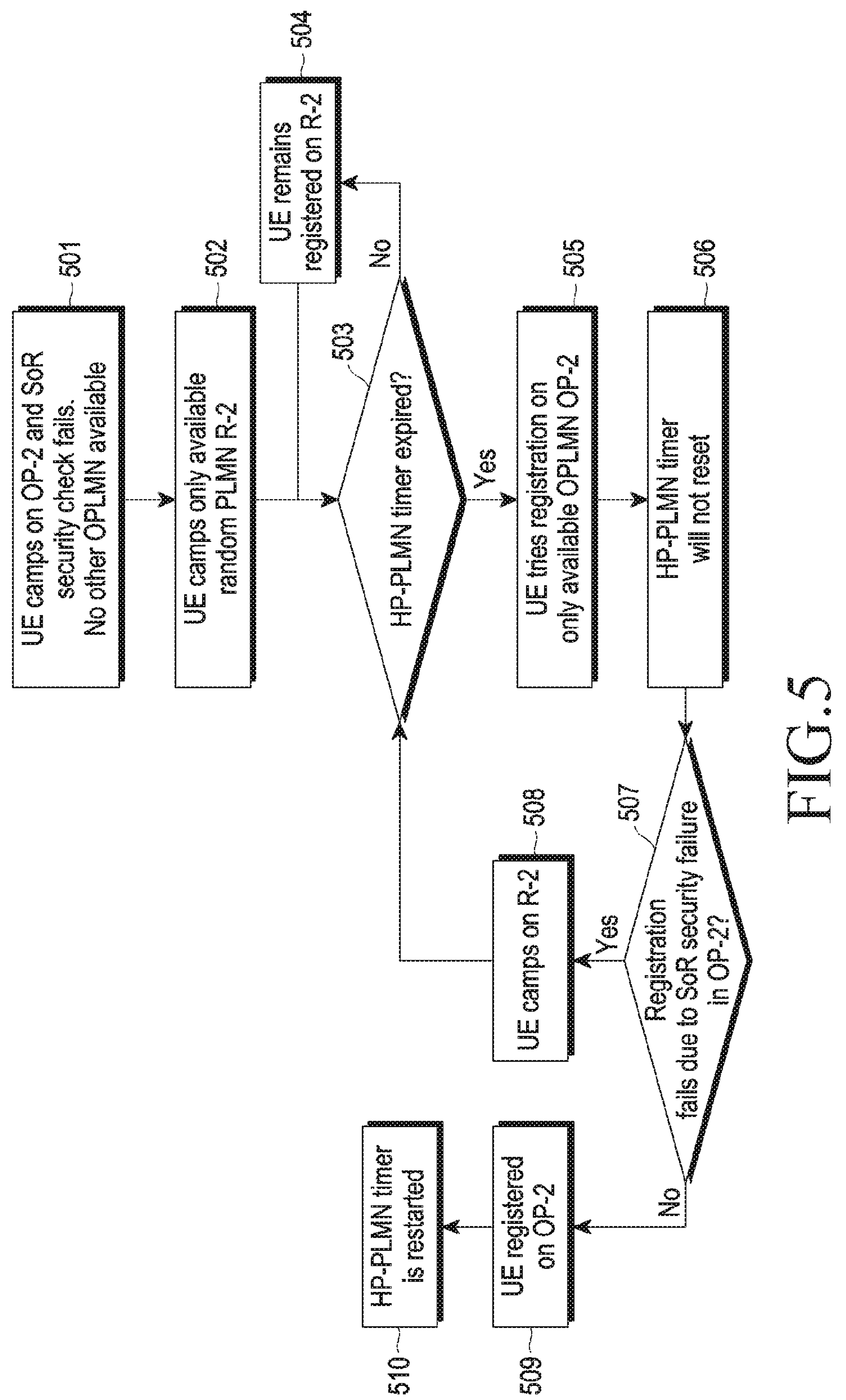
FIG. 5 illustrates a flow chart illustrating a scenario in which the UE resets a HP-PLMN timer only after successful registration on VPLMN, according to embodiments as disclosed herein.

FIG. 5 illustrates a flow chart illustrating a scenario in which the UE (100) resets the HP-PLMN timer only after successful registration on the VPLMN (20), according to the embodiments as disclosed herein.

The flow chart of the FIG. 5 includes steps 501-510. Consider, the UE (100) is configured for OPLMNs OP-1, OP-2, OP-3 and the Random PLMNs R-1, R-2, R-3. OP-2 is in the "PLMNs where registration was aborted due to SOR" list.

In step 501, the UE (100) attempts registration on OP-2 and the SoR security check fails. No other OPLMN is available. In step 502, the UE (100) attempts camp on R-2 and registers with R-2. R-2 is only available RPLMN and Op-2 is depriortized. The UE (100) determines whether the HP-PLMN timer is expired. If the HP-PLMN timer is expired in step 503, the UE (100) tries registration on OP-2 which is only available OPLMN in step 505 and the HP-PLMN timer will not reset in step 506. If the registration fails due to SoR security failure in OP-2 in step 507, the UE (100) camps on R-2 in step 508 and repeats steps 503, 505, 506 and 507. If the registration successes in OP-2 in step 507, the UE (100) is registered on OP-2 in step 509 and the HP-PLMN timer is restarted in step 510.

If the HP-PLMN timer is not expired in step 503, the UE (100) remains registered on R-2 in step 504.

Figure 2:
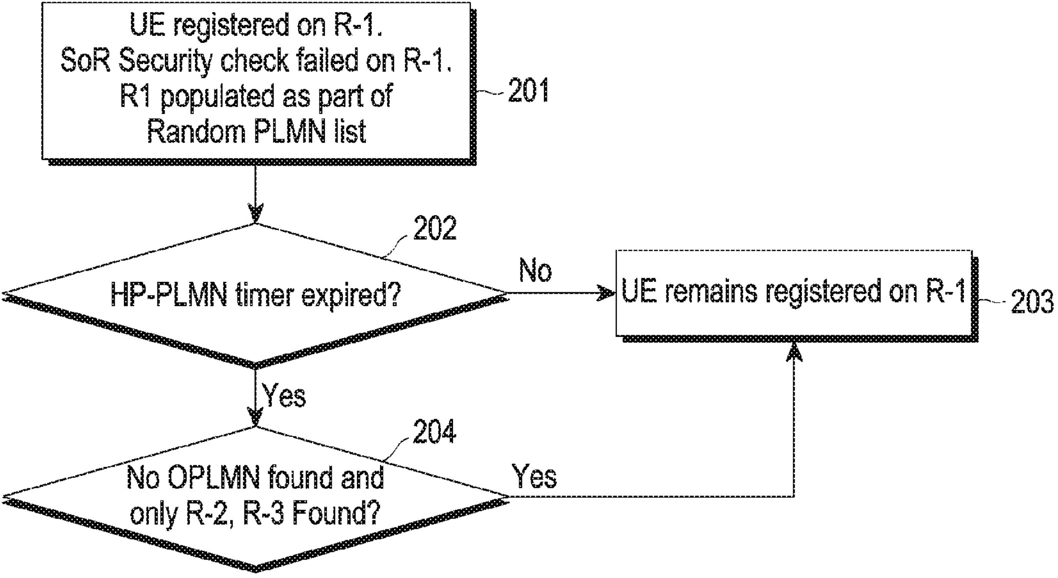
FIG. 2 illustrates a flow chart illustrates a scenario in which no OPLMN is found after a HP-PLMN search timer expiry and a SoR security failure has occurred in a registered PLMN, according to a prior art.

While comparing to the existing method described in FIG. 2, the UE (100) will still attempt to register on only available OPLMN OP-2 after the expiry of the HP-PLMN timer, but the HP-PLMN timer value will not be reset in the proposed method. So, in the next subsequent attempt, the HP-PLMN timer will keep increasing (as it is not reset) and the registration attempt on the OP-2 will be prolonged after each time registration fails on the OP-2. i.e. the HP-PLMN search timer is restarted when the registration attempt on the VPLMN (20) is successful. Hence, after receiving the registration accept message including SOR information and there is no SOR security check failure or any other failures.

In prior art, a) the UE is on R2. Start timer after 2 minutes it expires. b) the UE goes to OP-2 again security check failure. Thus the UE comes back to R2. Because timer is reseted. The timer will again expire in 2 minutes. Step a and b will happen in loop every 2 minutes. This will consume the UE's battery.

In an embodiment, the UE is on R2. Start timer after 2 minutes it expires. The UE goes to OP-2 again security check failure. Thus the UE comes back to R2. But timer is NOT reseted. The timer value will be next value that is T+6 minutes this time. Thus timer value will be 2, 8, 14, 20 minutes if you do not reset.

The MS/UE (100) shall make the first attempt after a period of at least 2 minutes and at most T minutes only after switch-on if fast first higher priority PLMN search is disabled. The MS/UE (100) shall make the first attempt after the period of at least 2 minutes and at most T minutes only after switch-on or upon selecting the VPLMN (20) and registration on that VPLMN (20) is successful, and the SOR check is successful, if the fast first higher priority PLMN search is enabled.

Figure 6:
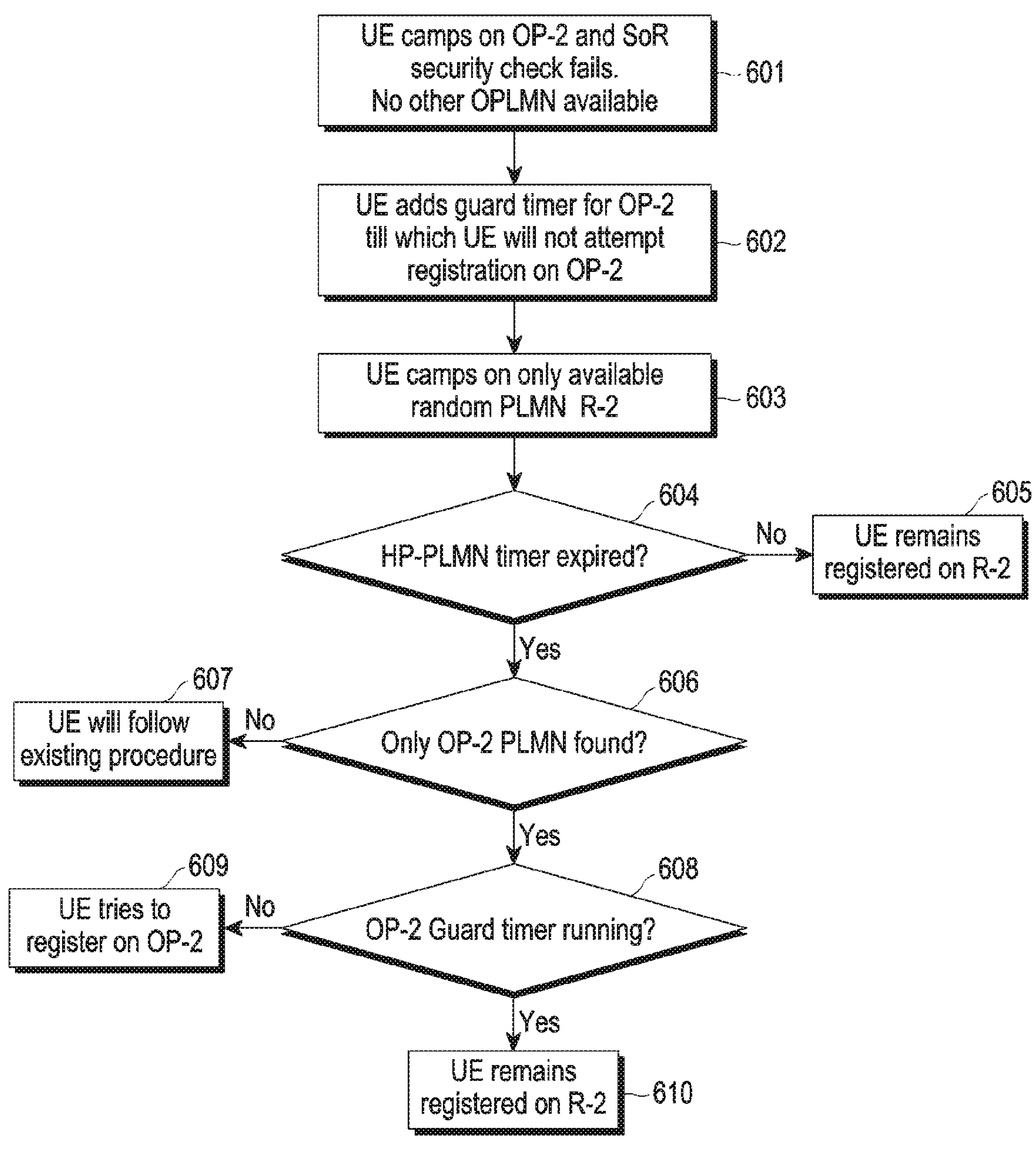
FIG. 6 illustrates a flow chart illustrating a scenario in which a guard timer is added if the SoR check fails, according to embodiments as disclosed herein.

FIG. 6 illustrates a flow chart illustrating a scenario in which a guard timer (150) is added if the SoR check fails, according to the embodiments as disclosed herein. The flow chart of the FIG. 6 includes steps 601-610. Consider, the UE (100) is configured for OPLMNs OP-1, OP-2, OP-3 and the Random PLMNs R-1, R-2, R-3. OP-2 is in the "PLMNs where registration was aborted due to SOR" list. In step 601, the UE (100) camps on OP-2 and the SoR security check fails. No other OPLMN is available. Consider that the guard timer has been proposed for each PLMN where the SoR security check fails until the UE will not attempt registration on OP-2. Further, the guard timer can be common for all those PLMNs which are part of "PLMNs where registration was aborted due to SoR" list (i.e. SOR abort list). The UE camps on R-2 which is only available random PLMN in step 603.

Till the expiry of the guard timer, the UE (100) will not attempt registration or make them lower priority on these PLMNs even though HP-PLMN timer is expired in step 604. The guard timer value may get incremented at each time the SoR security check fails at a particular PLMN. The guard timer can be pre-configured in the UE (100) (e.g. pre-configured in USIM or ME of UE (100)) or given by the network (e.g. HPLMN or VPLMN) to the UE (100) as part of NAS or Access Stratum (AS) message. HP-PLMN is a standard defined timer after which UE should scan again to see if it can find any higher priority PLMN. Guard timer in this invention is the time UE should not attempt on that particular PLMN to save battery.

If the HP-PLMN timer is expired in step 604, the UE (100) determines whether only the OP-2 is found in step 606. If the UE (100) determines only the OP-2 is found, the UE (100) determines the guard timer is running in step 608. If the UE (100) determines the OP-2 guard timer is running, the UE (100) remains registered on R-2 in step 610. If the UE (100) determines the guard timer is not running, the UE (100) tries to register on OP-2 in step 609.

If the HP-PLMN timer is not expired in step 604, the UE (100) remains registered on R-2 in step 605. If the UE (100) determines only the OP-2 is not found, the UE (100) follows existing procedure and UE remain registered on R-2 in step 607.

Figure 7:
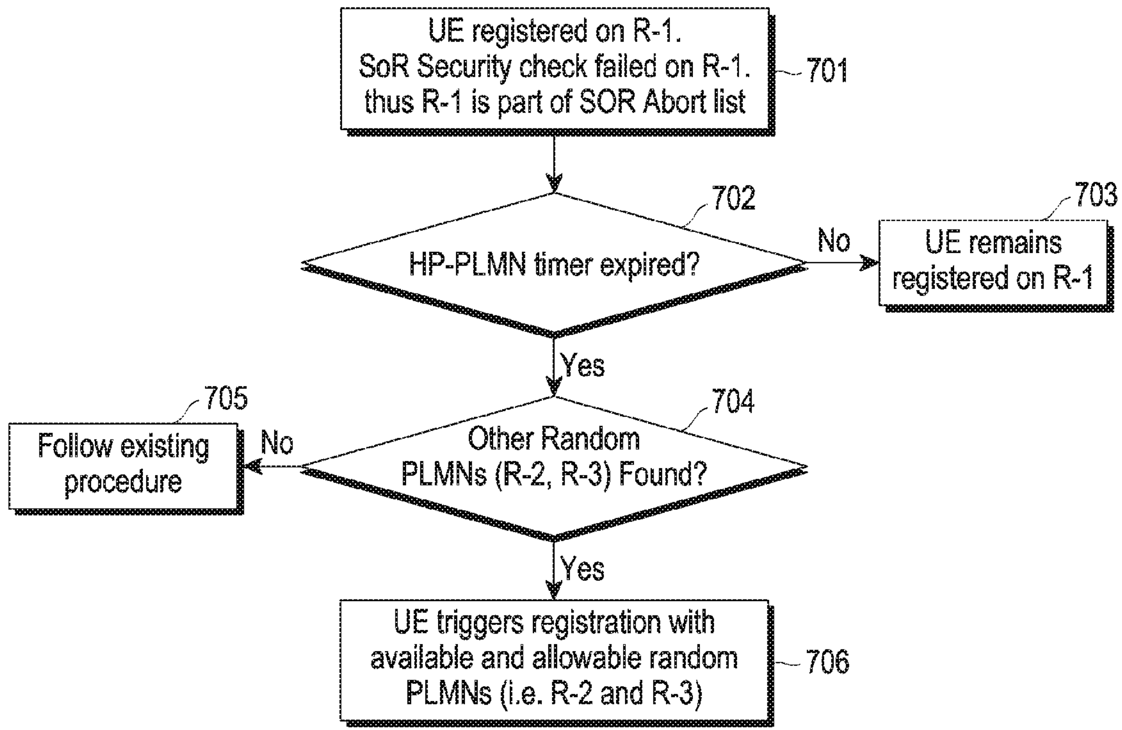
FIG. 7 illustrates a flow chart that illustrates a proposed scenario in which the UE will trigger registration with available and allowable random PLMNs, according to embodiments as disclosed herein.

FIG. 7 illustrates a flow chart illustrating a proposed scenario in which the UE will trigger registration with available and allowable random PLMNs, according to the embodiments as disclosed herein.

The flow chart of the FIG. 7 includes steps 701-706. Consider, the UE (100) is configured for OPLMNs OP-1, OP-2, OP-3 and the Random PLMNs R-1, R-2, R-3. OP-2 is in the "PLMNs where registration was aborted due to SOR" list.

The UE (100) will trigger the registration procedure to available and allowable random PLMNs, if no OPLMNs or Higher Priority PLMNs (HP-PLMNs) are found after the HP-PLMN timer expiry or any other implementation dependent time expired or the timer given by the network or as soon as the new random or any other higher priority PLMN is found. The SoR security check failed at the time of registration on the registered random PLMN.

In this case, consider the UE (100) is registered on the random PLMN R-1 and the SoR security check is failed at the time of registration (i.e., R1 is part of "PLMNs where registration was aborted due to SoR" list) in step 701. The HP-PLMN timer is expired or any other implementation dependent time expired or the timer given by the network expired in step 702 and the UE (100) found other random PLMNs R-2, R-3 in step 704. The UE (100) will trigger registration attempt to acquire service on the R-2 or the R-3 in step 706.

If the HP-PLMN timer is not expired, the UE (100) remains registered on R-1 in step 703.

If R-2, R-3 are not founded, the UE (100) follows existing procedure and UE remain registered on R-1 in step 705.

In conventional methods and systems, it is only mentioned that the PLMNs will be given lowest priority which are include in the "PLMNs where registration was aborted due to SoR" list. But within this list, how the priority of all PLMNs will be maintained is not clear. If the priority is not maintained within "PLMNs where registration was aborted due to SoR" list, it might affect the existing priority of the VPLMNs (UPLMNs or OPLMNs). In the conventional method UE (10) shall consider PLMNs which are in the list of "PLMNs where registration was aborted due to SOR" as lowest priority, if the UE (10) has a list of "PLMNs where registration was aborted due to SoR".

Unlike to the conventional methods and systems, the proposed UE (100) will maintain priority within "PLMNs where registration was aborted due to SOR" list as per the previous priority of UPLMN or OPLMNs. i.e., among the PLMNs in the PLMNs where registration was aborted due to the SOR the priority as defined in the SIM or ME is applicable. For example, consider the priority order is: OP-1, OP-2, OP-3, OP-4, OP-5, OP-6, OP-7 in the OPLMN list and UP-1, UP-2, UP-3 is for UPLMN list. Then irrespective of insertion order in "PLMNs where registration was aborted due to SoR" which contains the list say in the order OP-5, OP-1. While doing PLMN selection this list needs to be re-ordered in the priority level OP-1, OP-5. i.e. the UE (100) selects and attempts registration on other PLMN/access technology combinations, if available and allowable, in an order given below. For the PLMNs which are part of "PLMNs where registration was aborted due to SoR", then the order is:

i) Either the HPLMN (if an Equivalent HPLMN (EHPLMN) list is not present or is empty) or the highest priority EHPLMN that is available (if the EHPLMN list is present);
ii) Each PLMN/access technology combination in the "User Controlled PLMN Selector with Access Technology" data file in the SIM (in priority order);
iii) Each PLMN/access technology combination in the "Operator Controlled PLMN Selector with Access Technology" data file in the SIM (in priority order) or stored in a ME (in priority order);
iv) Other PLMN/access technology combinations with received high quality signal in random order. The high quality signal is defined in the appropriate AS specification.
v) Other PLMN/access technology combinations in order of decreasing signal quality.

Consider, "PLMNs where registration was aborted due to SOR" consists of OP-1, OP-2, R-1. In the available area there is a OP-3, OP-8, OP-1, OP-2, R-2, R-1 PLMNs area allowable and available. Then the UE (100) should prioritize the PLMNs in the following order OP-3, OP-8, OP-1, OP-2, R-2, R-1; i.e., among each list UPLMN, OPLMN, Random PLMN during PLMN selection. First the PLMNs which are not in "PLMNs where registration was aborted due to SOR" are prioritized after attempting them PLMNs which are in "PLMNs where registration was aborted due to SOR" and in respective UPLMN, OPLMN or Random PLMN are attempted; i.e., priority should of an order given below either when the higher priority PLMN search timer expires (i.e., T) or in general during any PLMN selection procedure for example during switch ON or loss of service.

The order is:

i) PLMNs in UPLMN list which are not part of "PLMNs where registration was aborted due to SOR"
ii) PLMNs in UPLMN list which are part of "PLMNs where registration was aborted due to SOR"
iii) PLMNs in OPLMN list which are not part of "PLMNs where registration was aborted due to SOR"
iv) PLMNs in OPLMN list which are part of "PLMNs where registration was aborted due to SOR"
v) PLMNs in Random list which are not part of "PLMNs where registration was aborted due to SOR"
vi) PLMNs in Random list which are part of "PLMNs where registration was aborted due to SOR"

Above is just an illustration, for example in general case PLMNs part of UPLMN list or random PLMNs are not part of "PLMNs where registration was aborted due to SOR". For the random PLMN based priority might be decided based on a signal strength. If the priority of the PLMNs are same the UE (100) can follow insertion order of the PLMNs in the list of "PLMNs where the registration was aborted due to SOR" to choose or prioritize PLMNs from the list. In yet another embodiment, the priority order of the PLMNs in "PLMNs where registration was aborted due to SOR" will follow the order of insertion. This can be considered as lowest priority during the complete PLMN selection procedure except before random PLMN list; i.e., this will have a lower priority when compared to the UPLMN, and the OPLMN. In yet another embodiment, the priority order of the PLMNs in "PLMNs where registration was aborted due to SOR", can be considered as lowest priority during the complete PLMN selection procedure. i.e., this can have a lower priority when compared to the UPLMN, the OPLMN and other available random PLMNs.

Figure 8:
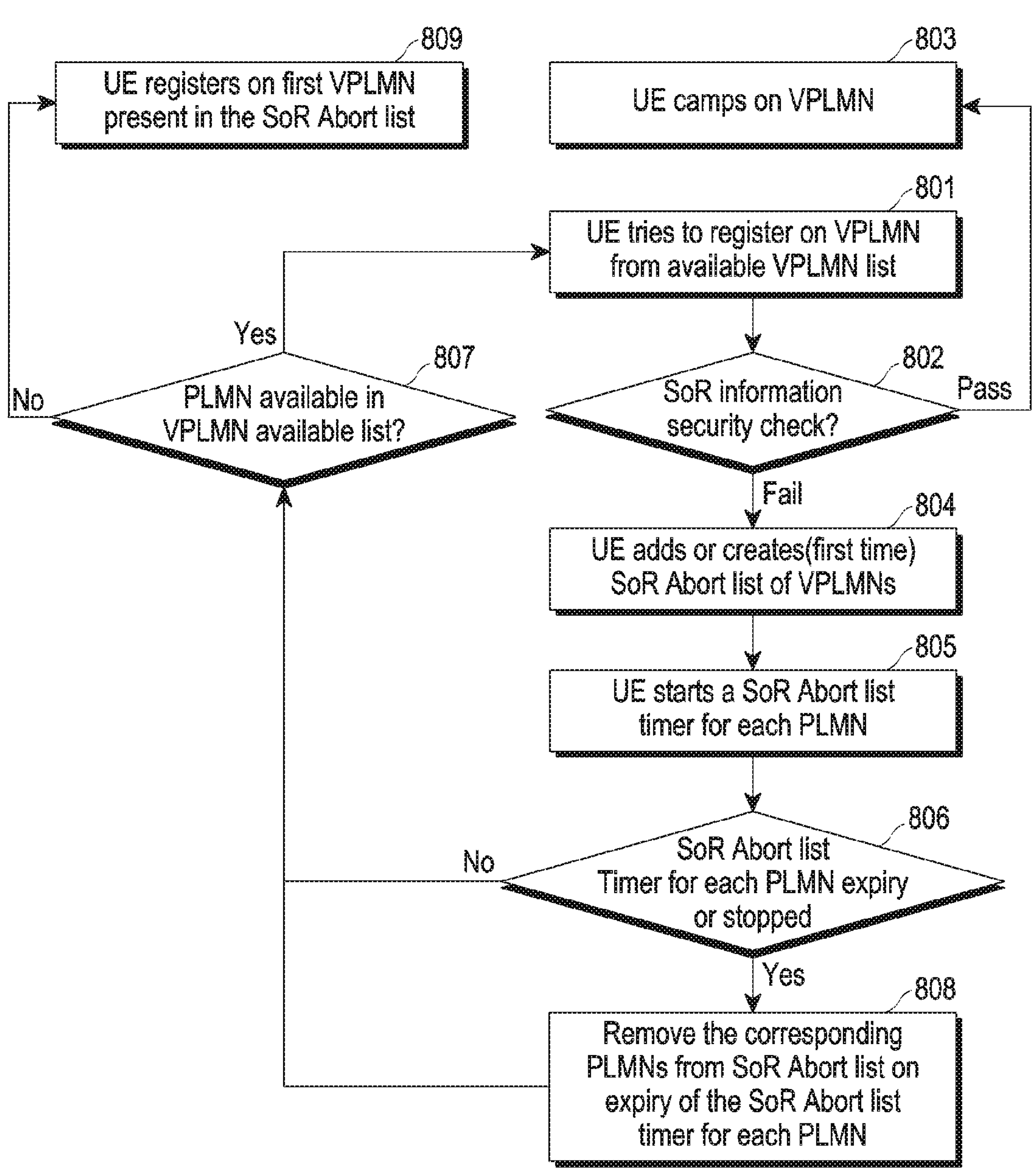
FIG. 8 illustrates a flow diagram depicting a process of maintaining VPLMN list during the SoR by maintaining the SoR abort list timer for VPLMNs, according to embodiments as disclosed herein.

FIG. 8 illustrates a flow diagram depicting a process of maintaining the VPLMN list during the SoR by maintaining the SoR abort list timer (150) for the VPLMNs (20), according to embodiments as disclosed herein.

The flow diagram of the FIG. 8 includes steps 801-809. Consider that the UE (100) is in a roaming area. As depicted in the FIG. 8, the UE (100) tries to register on the VPLMN (20) from the configured priority list in step 801. The UE (100) receives the SoR information from the VPLMN (20) and performs the SoR information security check in step 802. If the SoR information security check is successful, the UE (100) camps on the respective VPLMN (20) for accessing communication services in step 803.

If the SoR information security check fails with the VPLMN (20) in step 802, the UE (100) creates (first time or at initial stage) the "SoR abort list" of VPLMNs (20) in step 804. The "SoR abort list" corresponds to the "PLMNs where registration was aborted due to SoR". The UE (100) adds the VPLMN (20) with which the SoR information security check fails in the "SoR abort list" in step 804. The SoR abort list may be existed before the step 801. In an embodiment, on adding the VPLMN (20) to the "SoR abort list", the UE (100) starts the SoR abort list timer (150), if not running in step 805. Whenever the SoR abort list timer (150) is expired or stopped in step 806, the UE (100) removes all the VPLMNs (20) from the SoR abort list or deletes the complete SoR abort list in step 808. Thus, the UE (100) may not register with the VPLMN (20) until the SoR abort list timer (150) is expired or stopped. When the SoR abort list timer (150) is not expired or stopped in step 806, the UE (100) determines whether the PLMN is available in VPLMN available list in step 807, the VPLMN (20) is not included in the VPLMN available list because the VPLMN (20) is added in the Sor abort list of VPLMNs. i.e. till the SoR abort list timer (150) is running, the UE (100) may not attempt the registration on the PLMNs which are part of the SoR abort list by making PLMNs which are part of SoR abort list lower priority.

After step 808, the UE (100) determines whether the PLMN is available in VPLMN available list in step 807. If the PLMN is available in VPLMN available list, the UE (100) repeats step 801, 802, 804, 805, 806 and 808. If the VPLMN is not available in VPLMN available list, the UE (100) registers on the VPLMN (20) which the UE will attempt and register in the SoR abort list in step 809.

In this embodiment, the meaning of terms 'not attempt registration on the PLMNs' or making them lower priority is that those PLMNs are made low priority than the OPLMN list (wherein each PLMN/access technology combination in the "Operator Controlled PLMN Selector with Access Technology" data file in the SIM (in priority order) or stored in the ME (in priority order)) in the UE (100). After starting the SoR abort list timer (150), the UE (100) checks if other VPLMNs are available in the VPLMN list/search results. If the other VPLMNs are not available, i.e. no other allowable PLMN is available which can provide normal services to the UE (100) and optionally only Forbidden PLMNs are available in the area, the UE (100) registers on the first VPLMN present in the SoR abort list. Thus, once the UE (100) finds all the available VPLMNs are in the SoR abort list, the UE (100) registers with the first VPLMN of the SoR abort list for accessing the communication services. In such a scenario, the UE (100) optionally deletes the SoR abort list and the SoR abort list timer (150). After starting the SoR abort list timer (150), if the other VPLMNs are available, the UE (100) tries to register with any of the other VPLMNs and the above described steps may be repeated.

In an embodiment, the UE (100) starts the SoR abort list timer (150), when the SoR information security check fails while the UE (100) tries to register on the particular VPLMN (20), wherein if the SoR abort list timer (150) is already running, the UE (100) does not start the SoR abort list timer (150). In another embodiment, the UE (100) starts the SoR abort list timer (150), when the SoR information security check fails while the UE (100) tries to register on the particular VPLMN (20), where if the SoR abort list timer (150) is already running, the UE (100) stops the SoR abort list timer (150) and starts the SoR abort list timer (150) again (i.e., restarts the SoR abort list timer (150)).

In an embodiment, the UE (100) stops the SoR abort list timer (150) on detecting at least one condition. Examples of the condition may be, but are not limited to, during power on/off of the UE (100), during removal of the SIM from the UE (100), while the UE (100) found the HPLMN or an EHPLMN, while the UE (100) is performing a manual PLMN selection, or the like. In an embodiment, on expiring or stopping the SoR abort list timer (150), the UE (100) clears the VPLMNs (20) in the SoR abort list.

In an embodiment, the SoR abort list timer value may be pre-configured in the UE (100) or in a USIM of the UE (100). In an embodiment, the value of the SoR abort list timer (150) may be received by the UE (100) from the network as part of Non Access Stratum (NAS) or Access Stratum (AS) signaling message. The value of the SoR abort list timer (150) may be common for all the VPLMNs and received as a part of the NAS signaling message or the AS signaling message or any other transport medium like user plane data. The timer value can be given by a Home PLMN (HPLMN) or an Equivalent Home PLMN (EHPLMN), the entity responsible for providing this information can be UDM, AUSF, AMF or any other node In an embodiment, for example, the UE subscribes a A operator in a A country. If a user of the UE travels to a B country, A operator has an agreement with a B1 operator and a B2 operator in the B country which are VPLMNs. Thus both the B1 operator and the B2 operator can provide a service to the UE. The B1 operator provides cheaper rates to the A operator and the B2 operator is costly for the A operator. Thus the A operator has configured to the UE priority of PLMN (operator) selection in OPLMN list: the B1 operator-1st priority, the B2 operator-2nd priority. If the SoR security check failure happed on the B1 operator, the UE adds the B1 operator to a SoR abort list (a list of PLMNs where registration is aborted due to SoR). All the PLMNs in the SoR abort list are lower priority when compared to PLMNs in the OPLMN list. Now the 1st priority in the UE is the B2 operator included in the OPLMN list, the 2nd priority in the UE is the B1 operator included in the SoR abort list. The invention provides: the UE starts a timer and after an expiry of the timer, the UE deletes the SoR abort list. Thus priorities of the PLMNs in the UE are: The B1 operator-1st priority, the B2 operator-2nd priority.

If the timer is not expired, the B2 operator is available in the VPLMN available list and the UE attempts a registration on the B2 operator. If the SoR information security check for the B2 operation fails and the UE adds the B2 operator in the SoR abort list of VPLMNs which includes the B1 operator. If the timer is not expired, there is no available PLMN in the VPLMN available list. Thus the UE registers on one of VPLMNs included in the SoR abort list.

If the timer is expired, the UE removes the B1 operator and the B2 operator in SoR abort list. Thus the the B1 operator and the B2 operator are included in in the VPLMN available list, the UE attempts a registration on the B1 operator.

Figure 9:
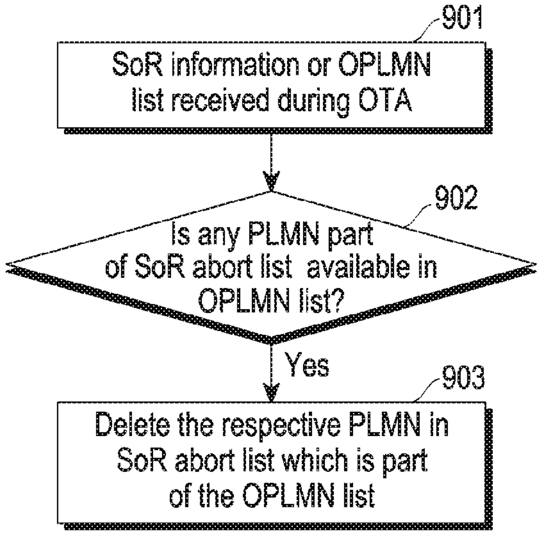
FIG. 9 illustrates a flow diagram depicting another process of maintaining VPLMN list during the SoR by managing an OPLMN list for the SoR, according to embodiments as disclosed herein.

FIG. 9 illustrates a flow diagram depicting another process of maintaining VPLMN list during the SoR by managing the OPLMN list for the SoR, according to embodiments as disclosed herein.

The flow diagram of the FIG. 9 includes steps 901-903. The UE (100) receives the SoR information or the OPLMN list using an OTA update in step 901, for example as part of a Short Message Service (SMS) message or using the user plane resources of a PDU session. The UE (100) checks whether any of the VPLMNs present in the SoR abort list is available in the newly received OPLMN list in step 902. The newly received OPLMN list is received as part of the SoR information or the OTA SMS message (in general, if the OPLMN list is updated either in SIM or ME). The UE (100) deletes (or removes) the corresponding VPLMNs which are present in OPLMN list, which are present in the OPLMN list from the SoR abort list in step 903, if those VPLMNs existed in the SoR abort list. i.e., all the PLMNs which are received as part of OPLMN list should be deleted (i.e., removed) from the SoR abort list. In this embodiment, the UE (100) triggers PLMN selection procedure whenever there is an update to the OPLMN list or update in the SoR abort list.

In the newly received SoR information or the OPLMN list if there are VPLMNs in the OPLMN list that are of higher priority than the currently camped VPLMN, then the UE (100) removes the corresponding VPLMNs (20) from the SoR abort list. In the newly received SOR information or the OPLMN list, if there are VPLMNs in the OPLMN list that are of lower priority than the current camped PLMN (i.e. selected PLMN), then UE (100) removes the corresponding VPLMNs (20) from the SoR abort list. Therefore, the UE (100) may obtain best possible roaming services and the HPLMN can have a better control on the SoR Abort list In yet another embodiment, the HPLMN or the VPLMN can transmit an indication to the UE (100) to delete the SoR abort list or remove a single VPLMN (20) or set of VPLMNs (20) from the SoR abort list. The HPLMN (for example by entities like UDM, AUSF, AMF etc.) can transmit the indication to the VPLMN (20) which is delegated to the UE (100) using one of the NAS message or the AS message or any other control plane message or user plane path. After receiving this indication from the HPLMN, the UE (100) will delete the SoR abort list or remove the respective PLMN(s) from the SoR abort list which the HPLMN has indicated to the UE (100).

Figure 10:
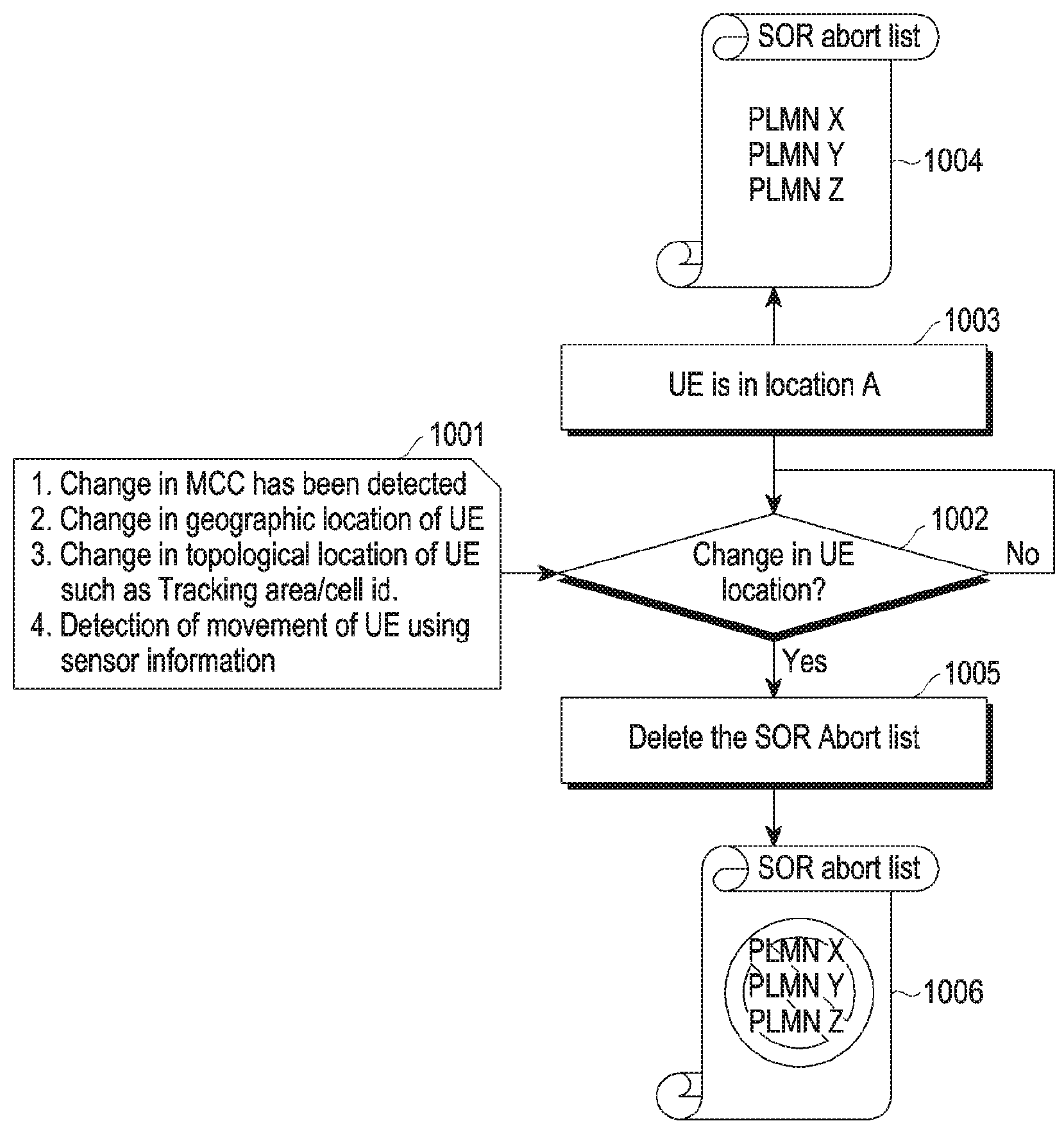
FIG. 10 illustrates a flow diagram depicting another process of maintaining VPLMN list during the SoR by maintaining the SoR abort list based on a location of the UE, according to embodiments as disclosed herein.

FIG. 10 illustrates a flow diagram depicting another process of maintaining VPLMN list during the SoR by maintaining the SoR abort list based on a location of the UE (100), according to embodiments as disclosed herein.

The flow diagram of the FIG. 10 includes steps 1001-1006. In an embodiment, in step 1002, if the UE (100) identifies a change in the location of the UE (100), from the location where the SoR abort list (1004) updated lastly, in step 1005, the UE (100) deletes the SoR abort list (1006). In an embodiment herein, this deletion can be per PLMN that is the PLMN which was added to the SoR abort list (1004) in a particular area is removed when UE (100) moves out of that area. In an embodiment, in step 1002, the UE (100) checks the change in the location, based on at least one of, a change in MCC detection, a change in UE geographic location, a change in UE topological location such as tracking area or cell ID, detection of the UE movement based on sensor information, and so on (1001). In an embodiment, in step 1002, the UE (100) identifies no change in the location of the UE (100), that is the UE (100) is in location A in step 1003, the UE (100) maintains the SoR abort list (1004) based on the location A.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method for managing a priority of visited public land mobile networks (VPLMNs) of a wireless communication network by a user equipment (UE), the method comprising:

receiving a registration accept message including steering of roaming (SoR) information from an access and mobility management function (AMF) of a VPLMN;

based on a security check of the SoR information being failed, adding the VPLMN to a list of public land mobile networks (PLMNs) where a registration was aborted due to SoR; and deleting the list after a predetermined time period.

2. The method of claim 1, further comprising:

modifying a priority of the VPLMN lower than a configured priority of the VPLMN during the predetermined time period.

3. The method of claim 1, further comprising:

determining whether the list is available in the UE; and creating the list upon determining that the SoR abort list is unavailable in the UE.

4. The method of claim 1, wherein a priority of the VPLMN is a configured priority.

5. The method of claim 1, further comprising:

after the predetermined time period or in response to deleting the list, determining whether a first VPLMN is available in a VPLMN available list; and in response to determining the first VPLMN is not available in the VPLMN available list, registering on the first VPLMN present in the list of PLMNs where a registration was aborted due to SoR.

6. The method of claim 1, wherein the UE considers at least one PLMN in the list as lowest priority.

7. A user equipment (UE) for managing a priority of visited public land mobile networks (VPLMNs) of a wireless communication network, the UE comprising:

a transceiver; and a processor coupled to the transceiver, wherein the processor is configured to:

receive a registration accept message including steering of roaming (SoR) information from an access and mobility management function (AMF) of a VPLMN, based on a security check of the SoR information being failed, add the VPLMN to a list of public land mobile networks (PLMNs) where a registration was aborted due to SoR, and delete the list after a predetermined time period.

8. The UE of claim 7, wherein the processor is further configured to:

modify a priority of the VPLMN lower than a configured priority of the VPLMN during the predetermined time period.

9. The UE of claim 7, wherein the processor is further configured to:

determine whether the list is available in the UE; and create the list upon determining that the list is unavailable in the UE.

10. The UE of claim 7, wherein a priority of the VPLMN is a configured priority.

11. The UE of claim 7, wherein the processor is further configured to:

after the predetermined time period or in response to deleting the list, determine whether a first VPLMN is available in a VPLMN available list, and in response to determining the first VPLMN is not available in the VPLMN available list, register on the first VPLMN present in the list.

12. The UE of claim 7, wherein the UE considers at least one PLMN in the list as lowest priority.

13. A non-transitory computer-readable storage medium storing instructions which, when executed by a processor of a user equipment (UE), causes the UE to perform operations, the operations comprising:

receiving a registration accept message including steering of roaming (SoR) information from an access and mobility management function (AMF) of a visited public land mobile network (VPLMN);

based on a security check of the SoR information being failed, adding the VPLMN to a list of public land mobile networks (PLMNs) where a registration was aborted due to SoR; and deleting the list after a predetermined time period.

14. The non-transitory computer-readable storage medium of claim 13, wherein the operations further comprises:

modifying a priority of the VPLMN lower than a configured priority of the VPLMN during the predetermined time period.

15. The non-transitory computer-readable storage medium of claim 13, wherein the operations further comprise:

determining whether the list is available in the UE; and creating the list upon determining that the SoR abort list is unavailable in the UE.

16. The non-transitory computer-readable storage medium of claim 13, wherein a priority of the PLMN is a configured priority.

17. The non-transitory computer-readable storage medium of claim 13, wherein the operations further comprise:

after the predetermined time period or in response to deleting the list, determining whether a first VPLMN is available in a VPLMN available list; and in response to determining the first VPLMN is not available in the VPLMN available list, registering on the first VPLMN present in the list.

18. The non-transitory computer-readable storage medium of claim 13, wherein the UE considers at least one PLMN in the list as lowest priority.

* * * * *